United States Patent
Provost, IV et al.

(10) Patent No.: US 7,837,075 B2
(45) Date of Patent: Nov. 23, 2010

(54) SPARE TIRE DYNAMIC DAMPER

(75) Inventors: Stephen B. Provost, IV, Phoenix, AZ (US); Clete V. Zurcher, Surprise, AZ (US); Tetsuya Kimura, Numazu (JP)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 887 days.

(21) Appl. No.: 11/697,767

(22) Filed: Apr. 9, 2007

(65) Prior Publication Data
US 2008/0245828 A1 Oct. 9, 2008

(51) Int. Cl.
*B62D 43/04* (2006.01)

(52) U.S. Cl. .............. 224/42.21; 224/42.23; 224/42.24; 267/91; 267/291

(58) Field of Classification Search .............. 224/42.12, 224/42.21, 42.23, 42.24; 267/37.2, 136, 267/286, 291, 91, 80, 248, 178, 166, 2
See application file for complete search history.

(56) References Cited

U.S. PATENT DOCUMENTS

| | | | | |
|---|---|---|---|---|
| 2,563,370 A | * | 8/1951 | Reese | 267/290 |
| 2,811,371 A | * | 10/1957 | Morehouse | 280/124.109 |
| 3,387,754 A | | 6/1968 | Sinkey et al. | |
| 3,387,854 A | * | 6/1968 | Pierce | 280/69 |
| 3,724,731 A | * | 4/1973 | Potgieter et al. | 224/42.23 |
| 4,410,117 A | | 10/1983 | Crawford et al. | |
| 4,862,983 A | * | 9/1989 | Kreft | 180/89.13 |
| 5,595,371 A | * | 1/1997 | Hukuda et al. | 267/34 |
| 5,746,418 A | * | 5/1998 | Jansen | 267/136 |
| 5,860,687 A | | 1/1999 | Corporon et al. | |
| 6,098,969 A | * | 8/2000 | Nagarajaiah | 267/136 |
| 6,406,000 B1 | * | 6/2002 | Raz et al. | 254/323 |
| 6,682,060 B2 | | 1/2004 | Kato et al. | |
| 6,682,293 B2 | * | 1/2004 | Dziedzic et al. | 414/463 |
| 6,871,841 B2 | * | 3/2005 | Brestelli et al. | 254/323 |
| 6,920,967 B2 | * | 7/2005 | Wood | 188/380 |
| 2006/0108489 A1 | | 5/2006 | Hartgers et al. | |
| 2008/0203120 A1 | * | 8/2008 | McGuire et al. | 224/42.21 |

FOREIGN PATENT DOCUMENTS

| | | | |
|---|---|---|---|
| JP | 5053588 A | | 3/1993 |
| JP | 11094018 A | * | 4/1999 |
| JP | 2005349967 A | * | 12/2005 |

* cited by examiner

*Primary Examiner*—Justin M Larson
(74) *Attorney, Agent, or Firm*—Dinsmore & Shohl LLP

(57) ABSTRACT

A spare tire dynamic damper for a vehicle comprises a mounting frame, at least one support plate, and a moveable spare tire attachment plate spaced between the at least one support plate and the mounting frame, wherein the spare tire attachment plate is configured to move in the space between the mounting frame and the at least one support plate. In this embodiment, the spare tire dynamic damper comprises a pair of coil springs, wherein each coil spring is extended from opposite faces of the spare tire attachment plate, and one or both of the coil springs is configured to oscillate upon the movement of the spare tire attachment plate.

17 Claims, 5 Drawing Sheets

_US 7,837,075 B2_

SPARE TIRE DYNAMIC DAMPER

TECHNICAL FIELD

Embodiments of this invention relate generally to a spare tire dynamic damper directed to damping vibration in a vehicle, and embodiments are specifically related to spare tire dynamic damper which utilizes a spare tire as a sprung mass in the vibration damping operation.

BACKGROUND OF THE INVENTION

Dynamic damper assemblies are commonly used in vehicles to reduce vibrations excited in vehicles and noise levels. Such vibrations can induce booming, droning, spattering, and/or squeaking sounds and can be transmitted to a steering wheel, rear view mirror, interior trim, or other portions of the vehicle's interior or to the surroundings. Reduction of such unwanted vibrations and associated noise improves the handling and comfort of a vehicle. Previous damper assemblies required a large mass to be used in the damper assembly, which adds extra weight to the vehicle and increases fuel costs. Accordingly, there is a need for damper assemblies which reduce unwanted vibrations inside the vehicle without sacrificing vehicle efficiency.

SUMMARY

In accordance with one embodiment of the present invention, a spare tire dynamic damper for a vehicle is provided. The spare tire dynamic damper comprises a mounting frame, at least one support plate, and a moveable spare tire attachment plate spaced between the at least one support plate and the mounting frame, wherein the spare tire attachment plate is configured to move in the space between the mounting frame and the at least one support plate. The spare tire dynamic damper comprises a pair of coil springs, wherein each coil spring is extended from opposite faces of the spare tire attachment plate, and one or both of the coil springs is configured to oscillate upon the movement of the spare tire attachment plate.

In accordance with another embodiment of the present invention, a spare tire dynamic damper for a vehicle is provided. The spare tire dynamic damper comprises a mounting frame, a moveable spare tire attachment plate comprising at least one opening, and a pair of coil springs extending from opposite faces of the moveable spare tire attachment plate. One of the coil springs is disposed between the moveable attachment plate and the mounting frame, wherein one or both of the coil springs is configured to oscillate upon the movement of the spare tire attachment plate. The spare tire dynamic damper comprises at least one guide rod extending through the at least one opening of the moveable spare tire attachment plate, wherein the at least one guide rod is configured to limit the movement of the spare tire attachment plate to one direction.

In accordance with yet another embodiment of the present invention, a method of damping vibration in a vehicle is provided. The method includes providing a spare tire dynamic damper coupled to a vehicle, which comprises a mounting frame, a moveable spare tire attachment plate and an attached spare tire, and a pair of coil springs extending from opposite faces of the moveable spare tire attachment plate. One of the coil springs is disposed between the moveable attachment plate and the mounting frame. The method further comprises moving the spare tire in response to an external vibrational force, and damping the external vibration by oscillating the tire and spring connected thereto at a vibrational frequency opposite a vibrational frequency of the external force.

Additional features and advantages provided by the embodiments of the present invention will be more fully understood in view of the following detailed description, in conjunction with the drawings.

BRIEF DESCRIPTION OF THE DRAWINGS

The following detailed description of specific illustrative embodiments of the present invention can be best understood when read in conjunction with the following drawings, where like structure is indicated with like reference numerals and in which.

DETAILED DESCRIPTION OF ILLUSTRATIVE EMBODIMENTS

Figure 1:
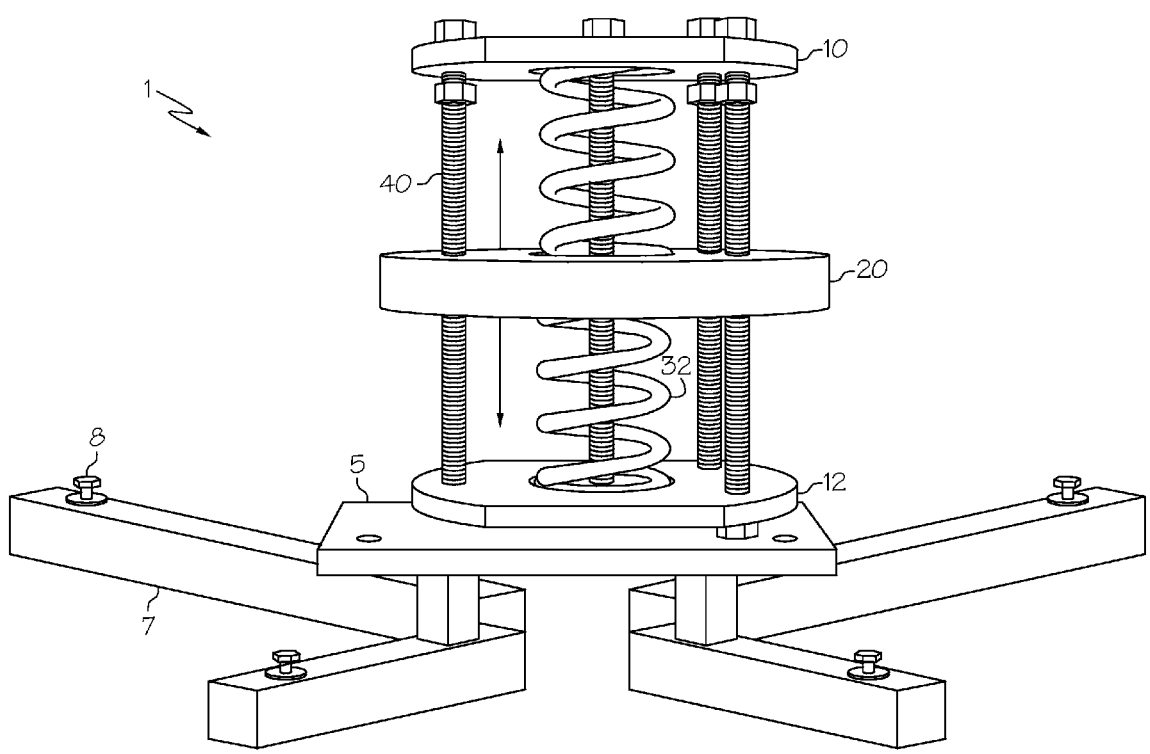
FIG. 1 is a side view of a spare tire dynamic damper assembly according to one or more embodiments of the present invention.
Figure 2:
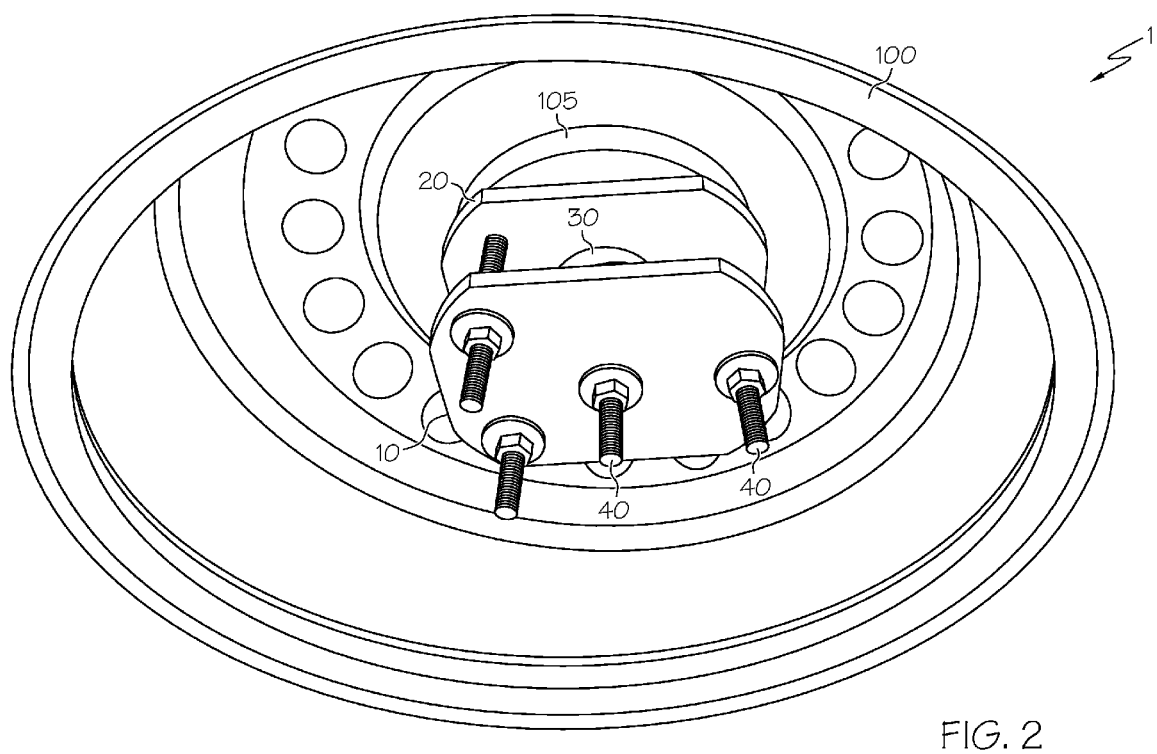
FIG. 2 is a partial perspective view illustrating the spare tire dynamic damper assembly on a first side of the spare tire according to one or more embodiments of the present invention.
Figure 3:
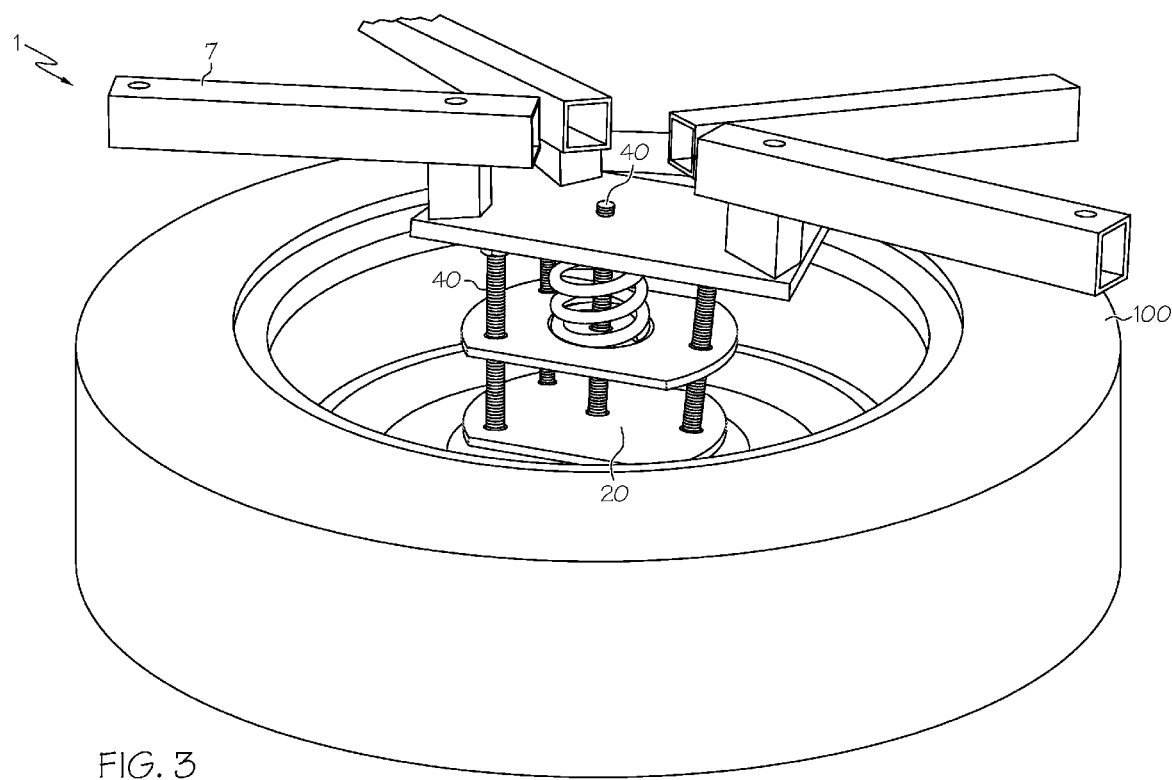
FIG. 3 is a perspective view illustrating the spare tire dynamic damper assembly on a second side of the spare tire with one coil spring omitted to highlight another coil spring according to one or more embodiments of the present invention.
Figure 4:
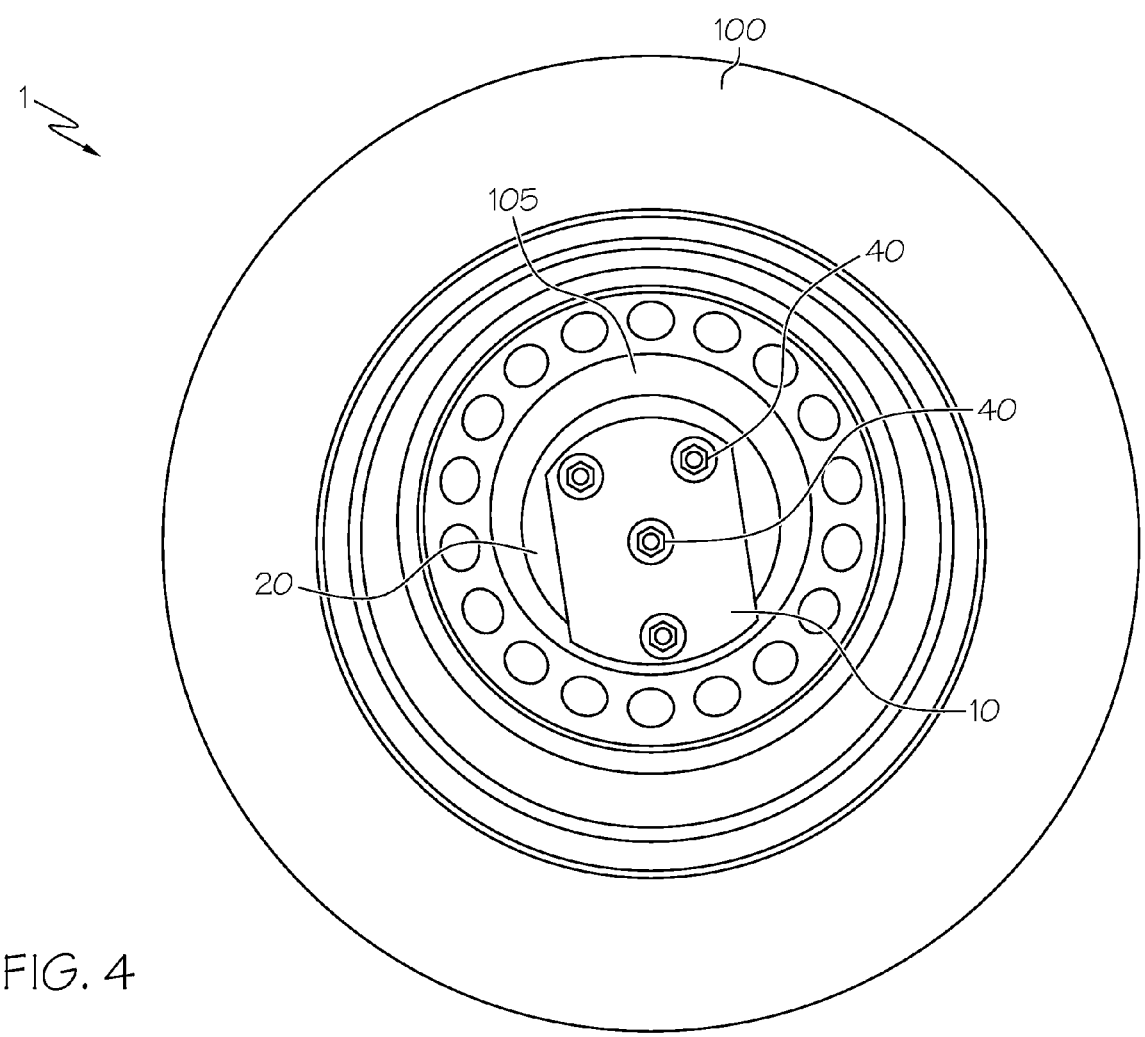
FIG. 4 is a perspective view illustrating the spare tire dynamic damper assembly on the first side of the spare tire according to one or more embodiments of the present invention.
Figure 5:
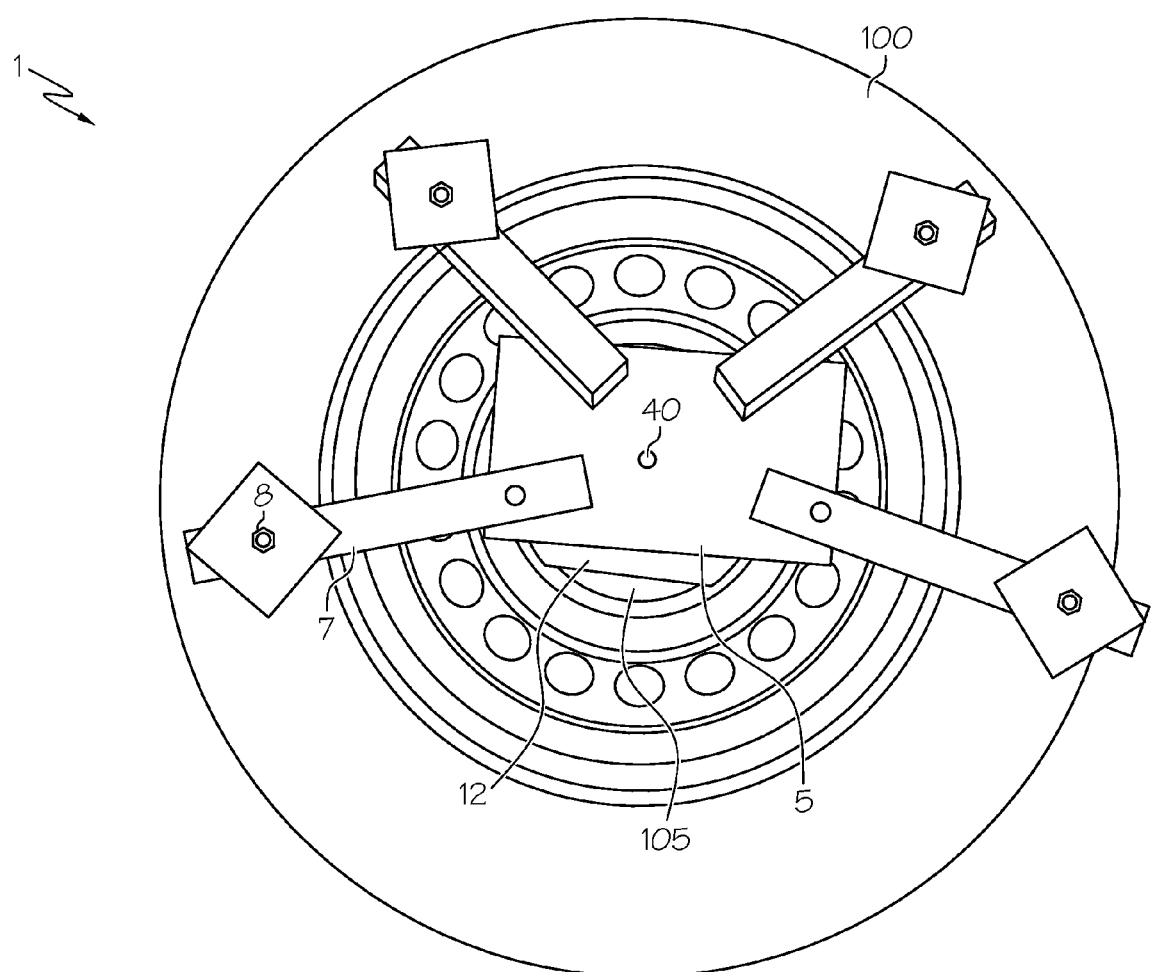
FIG. 5 is another perspective view illustrating the spare tire dynamic damper assembly on the second side of the spare tire according to one or more embodiments of the present invention.

Referring to FIG. 1, an embodiment of a spare tire dynamic damper 1 for a vehicle is provided. The dynamic damper 1 comprises a mounting frame 7 being operable to couple the dynamic damper 1 to a vehicle. The mounting frame 7 may comprise any durable materials, such as metal, metal alloys such as steel, as well as rigid polymers. The mounting frame 7 may comprise numerous coupling components suitable to couple the spare tire dynamic damper 1 to the vehicle 1. In one embodiment as shown in FIGS. 1 and 5, the mounting frame 7 comprises at least one bracket 8 connected to a support plate 5 and extending from the mounting frame 7 and configured to couple the dynamic damper to a vehicle surface. The number of brackets 8 and the configuration may be varied depending on a variety of factors e.g. where the damper is being coupled, how much tire weight is to be supported, etc. Other vehicle coupling mechanisms, in addition to brackets, are contemplated herein.

The spare tire dynamic damper 1 can be mounted on the under side of the vehicle, in the trunk, or another suitable location of the vehicle. In one exemplary embodiment, the spare tire dynamic damper 1 is arranged vertically, so that the sprung mass, i.e. the spare tire 100 can move upwardly and downwardly upon receiving a vibrational force. In this vertical arrangement, the mounting frame 7 couples to a surface from below, thereby producing a hanging arrangement, or may couple to the top of a surface. Although the discussion is directed to coupling the damper 1 to a vehicle, it is contemplated that the damper could be coupled to and utilized with other moving or stationary devices.

Referring to the embodiment of FIG. 1, the spare tire dynamic damper 1 also comprises at least one support plate, and in an exemplary embodiment, a pair of spaced support plates 10, 12. One of the plates 12 is coupled to the mounting frame by bolting, welding, or some other suitable coupling mechanism. Like the mounting frame 7, the support plates 10, 12 comprise durable material, for example, steel. Disposed between the support plates 10, 12 is a moveable spare tire attachment plate 20. The spare tire attachment plate 20 may couple with a spare tire 100 by any suitable coupling means, for example, screws, bolts, etc. In one embodiment, the spare tire attachment plate 20 may couple with the spare tire 100 at a hub location 105 of the spare tire. The spare tire attachment plate 20 is configured to move in the space between the support plates 10 and 12. Referring to FIG. 1, the dynamic damper 1 comprises a pair of coil springs 30 and 32 on opposite faces of the spare tire attachment plate 20. One coil spring 30 is disposed between the spare tire attachment plate and support plate 10, and the other coil spring 32 is disposed between the spare tire attachment plate 20 and support plate 12, which is coupled to the mounting frame 7. Coil springs of multiple sizes, frequencies, and strengths are contemplated herein. When the vehicle is at a rested position, the springs 30, 32 are configured to exert a spring force effective to counteract a gravitational force of the spare tire 100 and the spare tire attachment plate 20. When a vehicle encounters vibrational forces from uneven road surfaces, speed bumps, etc, the spare tire attachment plate 20 and the spare tire 100 thereon may move thereby compressing and expanding the coil springs 30, 32. The springs 30/32 are selected such that the spring damping response is tuned to a particular frequency range for the spare tire being used, such as the range of about 4 to about 16 Hz for a spare tire having a mass of about 5 to about 100 kg. The spring type can be chosen to provide this damping response, according to the equation $f_n = \frac{1}{2}\Pi (k/m)^{0.5}$, where $f_n$ is the system natural frequency in Hz, k is the spring constant, and m is the system mass. For example, a spring having the following dimensions and properties will provide a spring constant of about 80 N/mm which will allow damping of a frequency range of about 6 to about 7 Hz for a spare tire having a mass of about 45 kg. This exemplary spring may comprise a length of about 400 mm, a thickness of about 9 mm, a diameter of about 200 mm, and about 3.5 coils, and may be composed of a steel material. Other damping components other than springs 30, 32 can be used as alternatives, such as hydraulic or pneumatic damping components for example, and these likewise can be tuned to a frequency range of interest.

In another embodiment as shown in FIG. 1, the spare tire dynamic damper 1 comprises at least one guide rod 40 extending through the spare tire attachment plate 20. In a further embodiment, the guide rods may be coupled to support plates at opposite ends. The guide rods 40 coupled to the support plates 10 and 12 at opposite ends of the rods 40. The guide rods 40 may extend through a plurality of openings in the spare tire attachment plate 20; however, the rods 40 do not couple with the spare tire attachment plate 20. The rods 40 allow the spare tire attachment plate 20 to move directionally between the support plates 10, 12 by sliding along the guide rods 40; however, the rods restrict the movement of the spare tire attachment plate 20 to only that direction of motion (i.e., the direction along the rods). Other elongated guides can be used in addition to or as alternatives to the rods to allow the spare tire to move in the desired direction.

In one exemplary embodiment of vibration damping using the spare tire dynamic damper 1, the vehicle comprising a spare tire dynamic damper 1 drives over a pot hole on the road. For the purposes of this example, the spare tire dynamic damper 1 hangs on the underside of a vehicle. Due to the vibrational force delivered by the pothole, the spare tire 100 is forced downwardly, thereby compressing one spring and expanding another. This causes the springs to oscillate upwardly and downwardly, and cause the spare tire 100 and spare tire attachment plate 20 to oscillate therewith. The spare tire dynamic damper 1 may include guide rods to ensure that the oscillation is limited to the vertical direction. This oscillation defines a frequency opposite a vibrational frequency of the force produced by the pothole. These opposing phases substantially cancel each other out and lead to the damping of vibration in the vehicle.

It is noted that terms like "specifically," "preferably," "typically", and "often" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention. It is also noted that terms like "substantially" and "about" are utilized herein to represent the inherent degree of uncertainty that may be attributed to any quantitative comparison, value, measurement, or other representation.

While particular embodiments and aspects of the present invention have been illustrated and described, various other changes and modifications can be made without departing from the spirit and scope of the invention. Moreover, although various inventive aspects have been described, such aspects need not be utilized in combination. It is therefore intended to cover in the appended claims all such changes and modifications that are within the scope of this invention.

What is claimed is:

1. A spare tire dynamic damper for a vehicle comprising:
    a mounting frame;
    a bracket for connecting the mounting frame to a vehicle;
    at least one support plate having a first face facing the bracket and a second face facing in a direction opposite the bracket;
    a moveable spare tire attachment plate spaced between the at least one support plate and the mounting frame, wherein the spare tire attachment plate is configured to move in the space between the mounting frame and the at least one support plate; and
    a first coil spring extending from the first face in a direction toward the bracket and a second coil spring extending from the second face in a direction away from the bracket, wherein one or both of the first and second coil springs are configured to oscillate upon the movement of the spare tire attachment plate.

2. A spare tire dynamic damper according to claim 1 wherein the mounting frame comprises at least one bracket extending from the mounting frame, and configured to couple the dynamic damper to a surface.

3. A spare tire dynamic damper according to claim 1 further comprising a spare tire attached to the moveable spare tire attachment plate, and being operable to move with the spare tire attachment plate.

4. A spare tire dynamic damper according to claim 3 comprising a spare tire bolted to the spare tire attachment plate at the hub of the spare tire.

5. A spare tire dynamic damper according to claim 1 wherein one of the at least one support plates is coupled to the mounting frame such that the moveable spare tire attachment plate is spaced between the one of the at least one support plate and another of the at least one support plate, and each of the coil springs is coupled to a support plate.

6. A spare tire dynamic damper according to claim 5 further comprising at least one guide rod extending between the support plates, and coupled to the support plates at opposite ends of the at least one guide rod.

7. A spare tire dynamic damper according to claim 6 wherein the moveable spare tire attachment plate comprises at least one opening for the at least one guide rod to slide through.

8. A vehicle comprising:
a vehicle body; and
a spare tire dynamic damper of claim 1 coupled to the vehicle body via the mounting frame.

9. A spare tire dynamic damper for a vehicle comprising:
a mounting frame configured to mount to the vehicle;
a moveable spare tire attachment plate comprising at least one opening, the moveable spare tire attachment plate having a first face facing the mounting frame and a second face facing in a direction opposite the mounting frame;
a first coil spring extending from the first face in a direction toward the mounting frame and a second coil spring extending from the second face in a direction away from the mounting frame, wherein one or both of the first and second coil springs are configured to oscillate upon the movement of the spare tire attachment plate; and
at least one guide rod extending through the at least one opening of the moveable spare tire attachment plate, wherein the at least one guide rod is configured to limit the movement of the spare tire attachment plate to one direction.

10. A spare tire dynamic damper according to claim 9 further comprising a spare tire attached to the moveable spare tire attachment plate, and being operable to move with the spare tire attachment plate.

11. A spare tire dynamic damper according to claim 10 wherein the spare tire attachment plate is bolted to a hub of the spare tire.

12. A spare tire dynamic damper according to claim 10 wherein the springs are configured to exert a spring force effective to counteract a gravitational force of the spare tire.

13. A vehicle comprising:
a vehicle body; and
a spare tire dynamic damper of claim 9 coupled to the vehicle body via the mounting frame.

14. A method of damping vibration in a vehicle comprising:
providing a spare tire dynamic damper coupled to a vehicle and comprising
a mounting frame;
a moveable spare tire attachment plate; and
a pair of coil springs extending from opposite faces of the moveable spare tire attachment plate, one of the coil springs being disposed between the moveable attachment plate and the mounting frame;
attaching a spare tire directly to the moveable spare tire attachment plate;
moving the spare tire in response to an external vibrational force; and
damping the external vibration by oscillating the tire and spring connected thereto at a vibrational frequency opposite a vibrational frequency of the external force.

15. A method according to claim 14 further comprising tuning the springs to a desired frequency.

16. A method according to claim 14 wherein the external vibrational force is generated when a vehicle encounters road debris, or uneven road conditions.

17. A method according to claim 14 further limiting the motion of the spare tire by inserting guide rods into at least one support plate and spare tire attachment plate.

* * * * *